United States Patent [19]
Sandercock

[11] Patent Number: 5,000,415
[45] Date of Patent: Mar. 19, 1991

[54] ACTIVE VIBRATION ISOLATION SYSTEMS
[75] Inventor: John R. Sandercock, Affoltern, Switzerland
[73] Assignee: Newport Corporation, Fountain Valley, Calif.
[21] Appl. No.: 433,611
[22] Filed: Nov. 8, 1989
[51] Int. Cl.⁵ .......................................... F16M 13/00
[52] U.S. Cl. .................................... 248/550; 248/638
[58] Field of Search ............... 248/550, 913, 560, 562, 248/564, 615, 636, 638, 677; 267/140.1, 141; 188/378, 379, 380

[56] References Cited
U.S. PATENT DOCUMENTS

| | | |
|---|---|---|
| 2,924,420 | 2/1960 | Fink . |
| 2,964,272 | 12/1960 | Olson . |
| 3,276,762 | 10/1966 | Thomas . |
| 3,464,657 | 9/1969 | Bullard . |
| 3,592,422 | 7/1971 | Paine et al. . |
| 3,606,233 | 9/1971 | Scharton et al. . |
| 3,701,499 | 10/1972 | Schubert et al. . |
| 3,703,999 | 11/1972 | Forys et al. . |
| 3,784,146 | 1/1974 | Matthews . |
| 3,952,979 | 4/1976 | Hansen . |
| 4,033,541 | 7/1977 | Malueg . |
| 4,101,102 | 7/1978 | Lloyd . |
| 4,328,941 | 5/1982 | Phillips ............................. 248/638 |
| 4,336,917 | 6/1982 | Phillips . |
| 4,363,377 | 12/1982 | Van Gerpen . |
| 4,531,699 | 7/1985 | Pinson . |
| 4,615,504 | 10/1986 | Sandercock . |
| 4,643,385 | 2/1987 | Sandercock . |

FOREIGN PATENT DOCUMENTS

| | | |
|---|---|---|
| 0135800 | 4/1985 | European Pat. Off. . |
| 59-103045 | 6/1984 | Japan . |
| 571642 | 9/1977 | U.S.S.R. . |
| 581345 | 11/1977 | U.S.S.R. . |
| 2126759 | 3/1984 | United Kingdom . |

Primary Examiner—Ramon O. Ramirez
Assistant Examiner—Robert A. Olson
Attorney, Agent, or Firm—Benoit Law Corporation

[57] ABSTRACT

Isolating a load from a source of vibrations includes detecting vibrations from that source, and controlling a displacement transducer stage with these detected vibrations through a feedforward loop. Isolation is increased with a resilient mount between the displacement transducer stage and the load. Residual movements of the load may be detected and the displacement transducer stage may additionally be controlled with these detected residual movements through a feedback loop.

27 Claims, 5 Drawing Sheets

ACTIVE VIBRATION ISOLATION SYSTEMS

BACKGROUND OF THE INVENTION

Field of the Invention

The subject invention relates to vibration isolation systems, including methods and apparatus for isolating loads from sources of vibration.

Information Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Also, no preamble of any statement of invention or claim hereof is intended to represent that the content of that preamble is prior art, particularly where one or more recitations in a preamble serve the purpose of providing antecedents for the remainder of a statement of invention or claim.

A familiar passive isolator is a resilient block of elastic material, such as a block of rubber. More elaborate passive isolator systems have been disclosed in U.S. Pat. Nos. 2,924,420, by D. J. Fink, issued Feb. 9, 1960, for an anti-vibration mount, 3,276,762, by E. V. Thomas, issued Oct. 4, 1966, for an omnidirectional damped support member, 3,592,422, by T. O. Paine et al, issued Jul. 13, 1971, for a vibration isolation system using compression springs, and 3,784,146, by J. W. Matthews, issued Jan. 8, 1974, for a horizontal vibration isolation system, and in European Patent Application No. 84109992.2, by Rudolf Schrepfer, published under No. 0 135 800 on Apr. 3, 1985.

A measurement system for a passive isolator has been disclosed in Japanese Patent Publication No. 59-103045, by N. Fukushima, published Jun. 14, 1984.

U.S. Pat. No. 2,964,272, by H. F. Olson, issued Dec. 13, 1960, for vibration control apparatus, teaches actively decoupling a machine from the floor, and using the floor to actively eliminate vibrations in the machine.

U.K. Patent Application No. 2 126 759, by W. S. Newman, published Mar. 28, 1984, discloses use of an active countermass for compensating machine vibrations.

Soviet Patent No. 571 642, by S. A. Boidek, published Sep. 5, 1977, discloses a feedback control of structural resonances.

Feedback-damped passive isolators have been disclosed in U.S. Pat. Nos. 3,464,657, by R. W. Bullard, issued Sep. 2, 1969, for a vibration damped platform, 3,606,233, by T. D. Scharton et al, issued Sep. 20, 1971, for a vibration isolation system, 3,701,499, by D. W. Schubert et al, issued Oct. 31, 1972, for an active fluid isolation system, 3,703,999, by E. L. Forys et al, issued Nov. 28, 1972, for a wide band stabilizer, 3,952,979, by S. Hansen, issued Apr. 27, 1976, for an isolator, 4,033,541, by R. M. Malueg, issued Jul. 5, 1977, for a torque rejection soft mounted platform, 4,101,102, by W. B. Lloyd, issued Jul. 18, 1978, for vibration isolation load support apparatus, 4,336,917, by E. H. Phillips, issued Jun. 29, 1982, for a shock and vibration isolation system, 4,363,377, by H. W. Van Gerpen, issued Dec. 14, 1982, for an active seat suspension control system, and 4,531,699, by G. T. Pinson, issued Jul. 30, 1985, for an active vibration isolator, and Soviet Patent No. 581 345, by Kaun Poly, published Nov. 25, 1977 for a vibration insulation support with an electromechanical converter. Some of these patents are for a single axis only, others only for rotations, others for translations and rotations.

The disclosures of my U.S. Pat. Nos. 4,615,504, issued Oct. 7, 1986, and 4,643,385, issued Feb. 17, 1987, to RCA Corporation, also fall into that category.

Feedback isolators have proved commercially to be viable devices. However one limitation in their usefulness comes from the fact that if high isolation is required around the pass band centered at resonant frequency, then there will still be high gain present in the loop at frequencies far removed from resonant frequency. Stability of the loop dictates a roll-off not much faster than 6 dB/octave. This becomes troublesome at higher frequencies where, for example, at twenty times resonant frequency the gain is likely still to be greater than unity. But at frequencies in this range any supported structure, particularly a large structure, is likely to have resonances and so inevitably the system will try to oscillate. The compromise is therefore to limit the gain and reduce the size as far as possible so that the lowest structural resonances lie as far away as possible from resonant frequency. It is not sensible to reduce the resonant frequency because the system becomes softer and one of the big advantages of active over passive isolation systems is thereby lost.

There thus was a need for an active vibration isolation system that can be applied equally well to large and small structures, and that is inherently very stiff.

SUMMARY OF THE INVENTION

It is a general object of the invention to overcome the disadvantages and to satisfy the needs apparent from the above Information Disclosure Statement and from other parts hereof.

It is a germane object of the invention to provide improved vibration isolation systems.

It is related object of the invention to provide improved methods and apparatus for isolating loads from sources of vibration.

It is a cognate object of the invention to provide effective isolation at higher frequencies.

It is an allied object of the invention to correct effects of residual load movements.

It is a related object of the invention to provide active vibration isolation systems with combined feedforward and feedback stages.

It is also an object of the invention to improve the performance of piezoelectric displacement transducers.

Other objects of the invention will become apparent in the further course of this disclosure.

From one aspect thereof, the subject invention resides in a method of isolating a load from a source of vibrations, comprising in combination the steps of detecting vibrations from that source, providing a displacement transducer stage for compensating the vibrations for the load, providing a feedforward loop, controlling the displacement transducer stage with detected vibrations through the feedforward loop, and increasing isolation with a resilient mount between the displacement transducer stage and the load.

A preferred embodiment of the invention detects residual movements of the load, provides a feedback loop, and controls the displacement transducer stage additionally with these detected residual movements through that feedback loop.

From a related aspect thereof, the invention resides in an active vibration isolator for isolating a load from a source of vibrations, comprising, in combination, a base, a resilient mount for the load, and a feedforward vibration isolation apparatus including a vibration detector stage adapted to be coupled to the source of vibrations, a displacement transducer stage between that base and the resilient mount, and a feedforward loop including the vibration detector stage and the displacement transducer stage.

A preferred embodiment of the invention includes a residual movement detector stage adapted to be coupled to the load, and a feedback loop including that residual movement detector stage and the displacement transducer stage.

The invention resides also in a method of linearizing performance of a piezoelectric displacement transducer, comprising the steps of energizing that piezoelectric displacement transducer, providing a first feedback signal proportional to the electric charge on the piezoelectric displacement transducer, and providing a second feedback signal proportional to the voltage on the piezoelectric displacement transducer, and linearizing the voltage-displacement characteristic of the piezoelectric displacement transducer with these first and second feedback signals.

From a related aspect thereof, the invention resides in a displacement transducer stage, comprising, in combination, a piezoelectric displacement transducer of an inherently non-linear voltage-displacement characteristic, means coupled to that piezoelectric displacement transducer for providing a first feedback signal proportional to the electric charge on the piezoelectric displacement transducer, means coupled to the piezoelectric displacement transducer for providing a second feedback signal proportional to the voltage on the piezoelectric displacement transducer, and means for linearizing the voltage-displacement characteristic of the piezoelectric displacement transducer with the first and second feedback signals.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
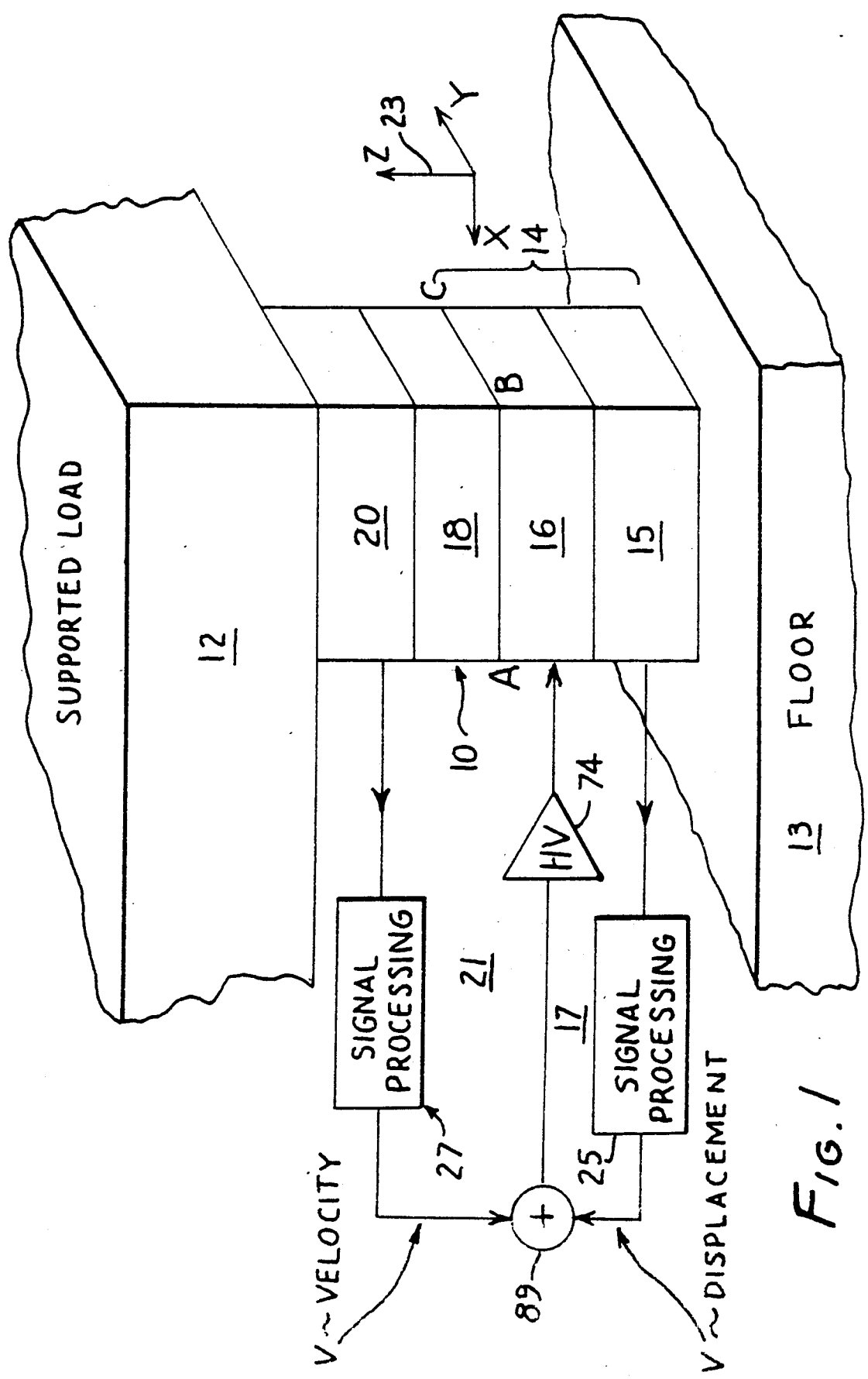
FIG. 1 is a diagrammatic and partially perspective view of an active vibration isolator according to an embodiment of the invention.

FIG. 1 shows an active vibration isolator 10 for isolating a load 12 from a source of vibrations 13, which may be a building part such as a floor, or another support subject to or generative of vibrations. The load 12 may of itself be a building part or a support, such as an optical or other table, or may be a piece of machinery or other equipment to be isolated from vibrations. Three or more isolators 10 may be used for supporting the load.

The or each vibration isolator is or includes a feedforward vibration isolation apparatus 14 including, in turn, a vibration detector stage 15, a displacement transducer stage 16, and a feedforward loop 17 including that vibration detector stage and that displacement transducer stage, and a resilient mount 18 on the displacement transducer stage 16.

The invention thus or in any other manner detects vibrations from the floor or other vibration source 13, provides a displacement transducer stage 16 for compensating the vibrations for the load 12, provides a feedforward loop 17, controls the displacement transducer stage 16 with the detected vibrations through that feedforward loop, and increases isolation with a resilient mount 18 between the displacement transducer stage and the load 12.

The feedforward stage 15-17-16 is basically a rigid device. Even with unity gain an upper frequency exists by which the gain must be rolled off. For higher frequencies there would therefore be no isolation. In order to achieve high frequency isolation the subject invention employs the resilient mount 18 in combination with the feedforward stage.

One of the functions of the resilient mount 18 is to ensure that the supported load 12 does not adversely affect the feedforward stage by direct mechanical coupling to it.

In many applications it is sufficient if the compliance of resilient mount 18 is about one order of magnitude greater than that of the displacement transducer stage 16. The compliance of the displacement transducer stage 16 can be made very low, especially if piezoelectric transducers are used.

The stage 18 may be purely passive. By way of example, a viscous damped spring may be used at 18.

A feedforward stage 15-17-16 in combination with a passive isolator or resilient mount 18 will work, even without a further stage 20 and feedback loop 21.

Nevertheless, where residual movements are still appreciable, an embodiment of the invention detects residual movements of the load 12, provides a feedback loop 21, and controls the displacement transducer stage 16 additionally with such detected residual movements through that feedback loop. Accordingly, FIG. 1 shows the active vibration isolator 10 as including a residual movement detector stage 20 on the resilient mount 18, and a feedback loop 21 including that resilient movement detector stage 20 and the displacement transducer stage 16.

In the illustrated embodiment, residual movements are detected between the resilient mount 18 and the load 12. Accordingly, FIG. 1 shows the residual movement detector stage 20 between the resilient mount 18 and the load 12.

Whether the residual movement detector stage 20-21 is used or not, an embodiment of the invention supports the load 12 relative to the source of vibrations 13 with the displacement transducer stage 16 and the resilient mount 18 in series. In this respect, FIG. 1 shows the displacement transducer stage 16 and the resilient mount 18 as part of a support of the load 12 between the source of vibrations 13 and that load.

Vibrations are being detected between the source of vibrations and the displacement transducer stage. Accordingly, FIG. 1 shows the vibration detector stage 15 between the source of vibrations 13 and the displacement transducer stage 16.

For maximum effectiveness, vibrations are detected in three orthogonally related directions, such as at 15, and the transducer stage 16 may compensate such vibrations for the load 12 in three orthogonally related directions, indicated at 23 in FIG. 1.

Similarly, residual movements of the load 12 preferably are detected in three orthogonally related directions, and the displacement transducer stage 16 is controlled additionally in three orthogonally related directions in response to the residual movements detected in three orthogonally related directions, such as at 20.

Three orthogonal absolute motion detectors may be used at 15. The detected vibration signals from the absolute motion detectors at 15 must be suitably processed to give signals proportional to the absolute displacements. For example, if the detectors are accelerometers the output signals must be double integrated, such as at 25. The processed output voltages may be written:

$$V_{x1} = k\Delta x_1 \tag{1}$$

$$V_{y1} = k\Delta y_1 \tag{2}$$

$$V_{z1} = k\Delta z_1 \tag{3}$$

where $\Delta x_1 \Delta y_1 \Delta z_1$ are dynamic displacements of the floor in the orthogonal axes x, y, z and k is a constant of proportionality.

These voltages are applied to orthogonally active transducers in stage 16. By way of example, it will be assumed that these transducers are piezoelectric, producing displacements $k_1 V_{x1}$ $k_1 V_{y1}$ $k V_{z1}$ in response to the applied voltages, where $k_1$ is a constant of proportionality. However, any displacement transducer may be used; there is no restriction to the use of piezoelectric devices within the scope of the invention.

In response to these applied voltages, any point in the plane ABC indicated in FIG. 1 will undergo a resultant absolute displacement $$\Delta x_2 = \Delta x_1 + k_1 V_{x1} = \Delta x_1 (1 + kk_1) \tag{4}$$

$$\Delta y_2 = \Delta y_1 (1 + kk_1) \tag{5}$$

$$\Delta z_2 = \Delta z_1 (1 + kk_1) \tag{6}$$

By adjusting the gain factor $k_1$ so that $kk_1 = -1$, the absolute movement of any point in the plane ABC can in principle be reduced to zero. As disclosed above the feedforward stage 14 in combination with the resilient mount or stage 18 thus works according to a first aspect of my invention.

However, some residual movements may occur in practice, such as, for example, due to non-linearities in the characteristic of the displacement transducer 16 or due to incorrect setting of the gain control. These residual movements are reduced in a second stage in which suitably processed signals from the motion detector stage 20 are applied as additional correction signals to the transducer stage 16. The correct signal for this feedback loop at 21 is a voltage proportional to the absolute velocity components measured by the detectors 20. If these detectors are accelerometers, the signals would be obtained by a single integration, such as at 27. The effect of this feedback loop at 21 is to strongly damp the movements associated with the resilient mount 18. The resultant motion at detector stage 20 may be expressed as $$\Delta x_4 = \Delta x_2 \left[ \frac{1}{1 - \left(\frac{\omega}{\omega_0}\right)^2 + iG\left(\frac{\omega}{\omega_0}\right)} \right] \tag{7}$$

wherein $\omega$ is vibration frequency, G is the gain in the feedback loop and $\omega_0$ is the resonance frequency of the supported load on the resilient block or mount 18. Similar expressions obtain for the two remaining orthogonal components $\Delta y_4$ and $\Delta z_4$ in the resilient motion detector stage 20.

Finally for the two stage system 15-16-17-18-20-21, the transmissibility $$Tx = \frac{\Delta x_4}{\Delta x_1} \text{ may be written as} \tag{8}$$

$$Tx = (1 + kk_1) \left[ \frac{1}{1 - \left(\frac{\omega}{\omega_0}\right)^2 + iG\left(\frac{\omega}{\omega_0}\right)} \right]$$

with equivalent expressions for the other directions.

Figure 2:
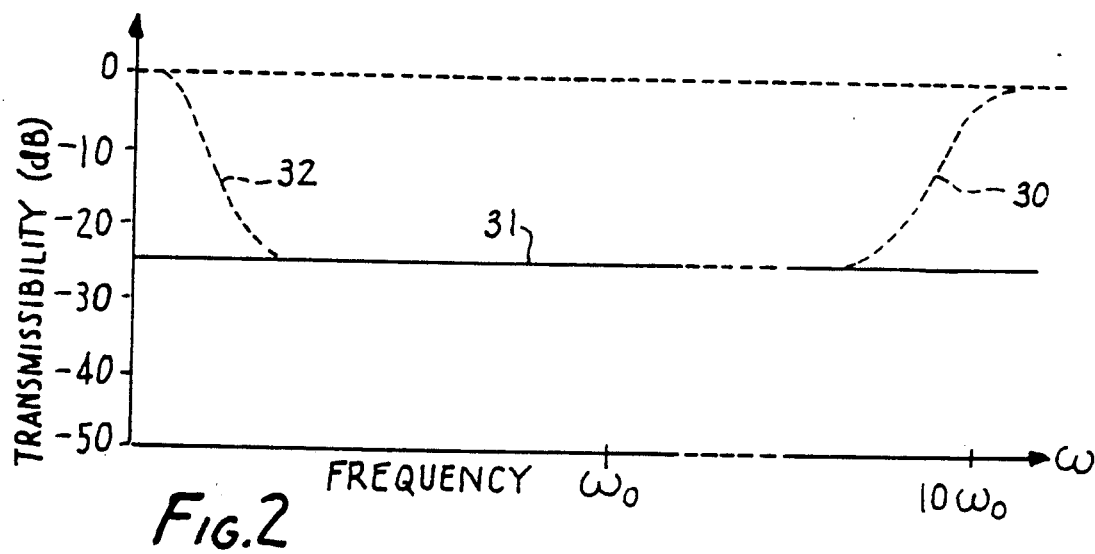
FIGS. 2 to 4 are plots explaining the operation of the isolator of FIG. 1.
Figure 3:
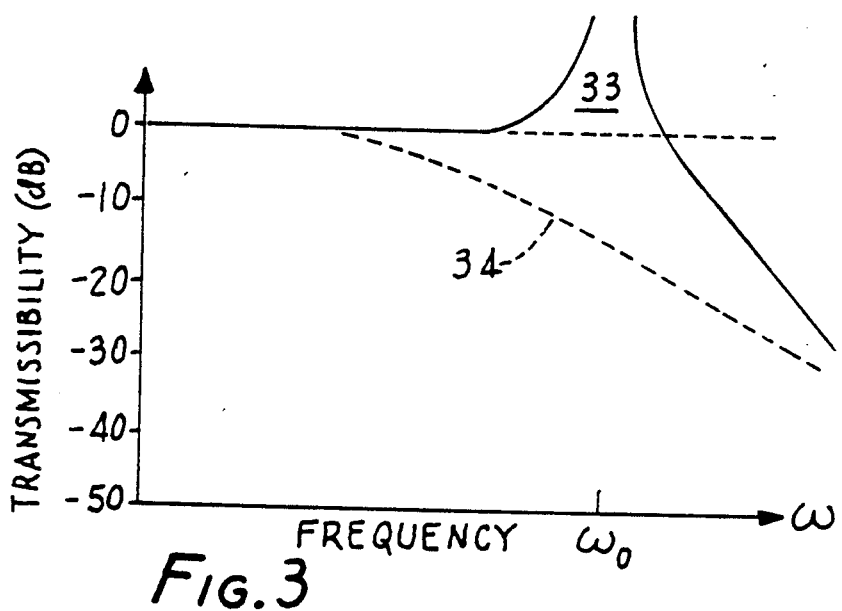
Figure 4:
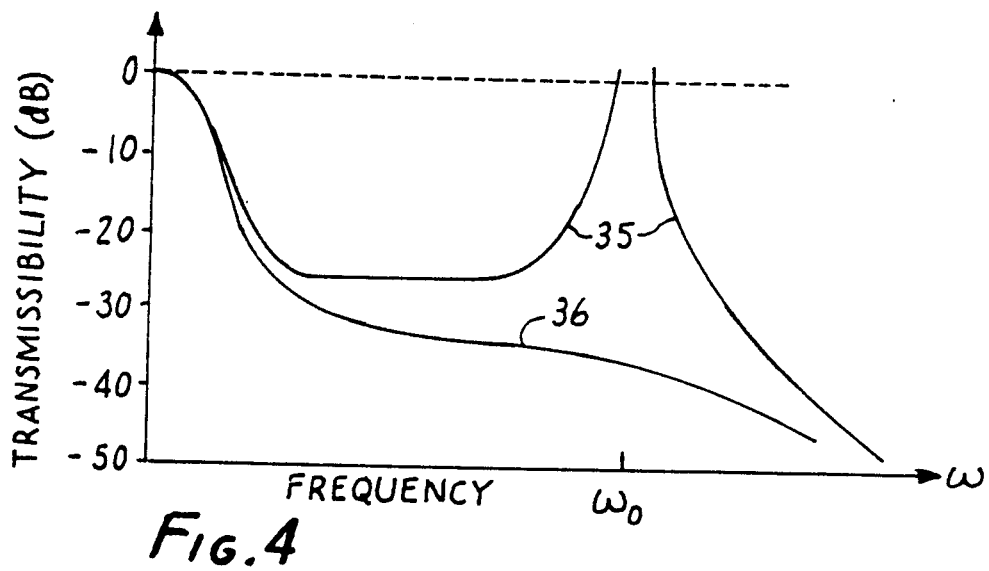

The effect of the different stages according to an embodiment of the invention can be seen with reference to FIGS. 2, 3 and 4. The transmissibility of stages 15 and 16 acting together is shown in FIG. 2 by the solid line 31. A value of $-25$ dB is shown in FIG. 2 as a value that can easily be achieved in practice. At some low frequency the response is rolled off to 0 dB, reflecting the fact that absolute motion detectors cannot detect displacements down to 0 Hz. This rolled-off response is indicated by the dotted line 32. At some upper frequency (typically $> 10\omega_0$) the response is also rolled off to avoid problems with structural resonances, as indicated by a dotted line 30.

The resilient block 18 acts (without feedback) as a purely passive isolator and will show the well-known resonant characteristics indicated at 33 in FIG. 3. When the feedback from the residual motion detector stage 20 is included, the resonance is eliminated and the transmissibility over a range of frequencies centered about the resonant frequency $\omega_0$ is reduced as shown by the dotted line 34 in FIG. 3.

An example of the transmissibility for the whole system is shown in FIG. 4, where the solid line 35 shows the combined effect of stages or blocks 15, 16 and 18 (without feedback), and where the curve 36 shows the total characteristic when feedback from detectors 20 is included.

The isolator, according to the illustrated embodiment of that aspect of the invention, is a two-stage system consisting of a feedforward, or subtractive, stage 14 including stages 15 and 16, having unity gain, in combination with a feedback-damped passive isolator including blocks or stages 16, 18 and 20.

Within the scope of the invention, the system could be extended to a multistage device by introducing further feedforward stages between stage or block 15 and the floor or vibration source 13, thereby increasing the isolation.

A big advantage of a two-stage system according to an aspect of the invention may be seem from the following example: The combination of, for example, two stages 15-17-16 and 18-20-21-16 each with a transmissibility of 0.1 will have the same transmissibility as a single feedback stage of transmissibility 0.01 but the feedback gain is now reduced by a factor of 10 thereby greatly reducing the high frequency resonance problem, and therefore allowing much larger loads 12 to be supported. Also the feedforward stages 15-17-16, have unity gain and are therefore highly stable against structural resonances.

Figure 5:
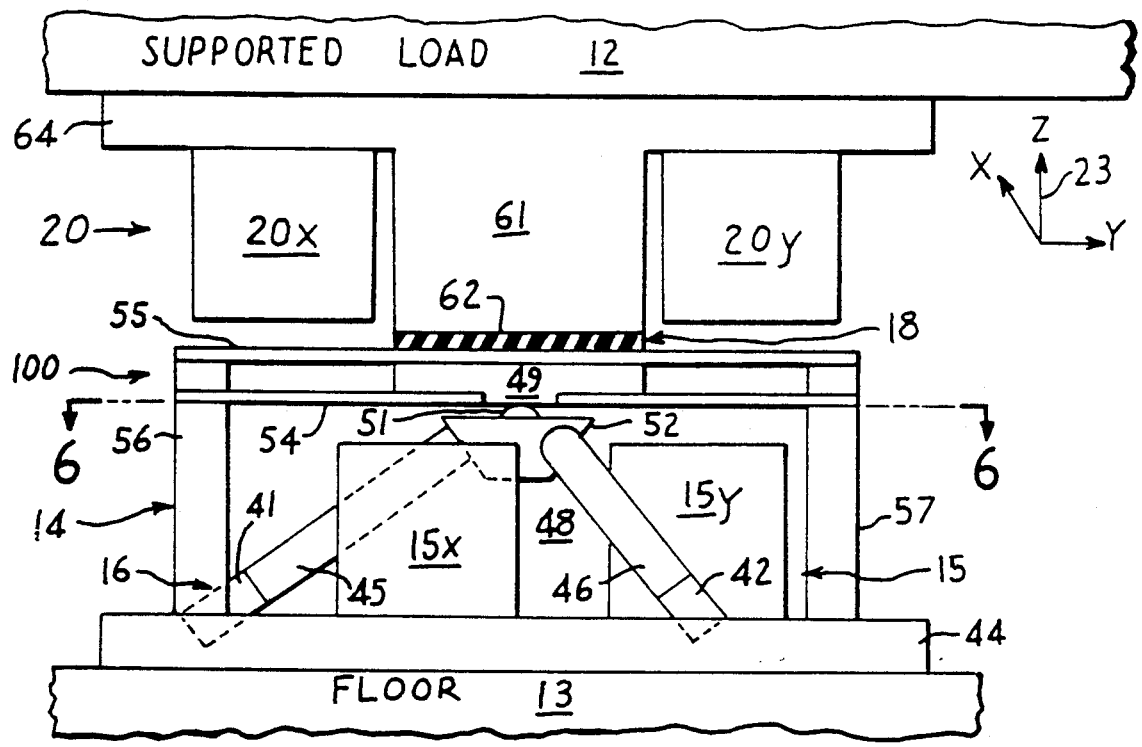
FIG. 5 is a side view of an active vibration isolator according to a preferred embodiment of the invention.
Figure 6:
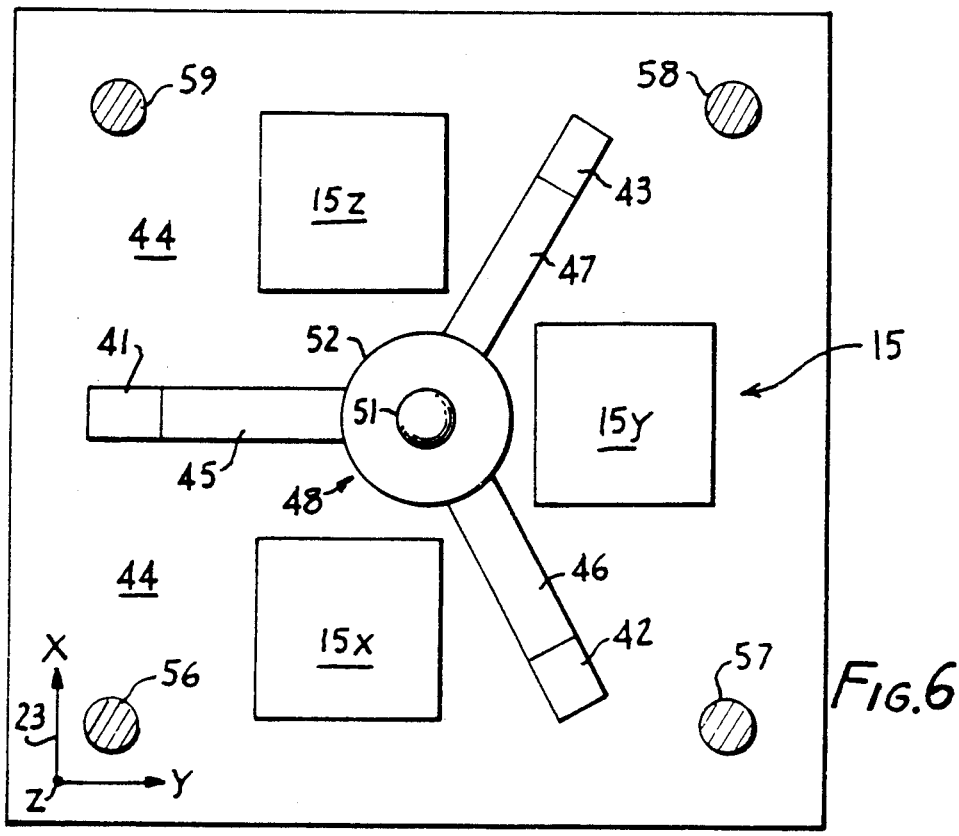
FIG. 6 is a plan view taken along the line 6—6 in FIG. 5.

A side view, partially in section, of an isolator 100 according to a preferred embodiment of the invention is shown in FIG. 5, while FIG. 6 shows a plan view of the displacement transducer stage 16 taken on the line 6—6 in FIG. 5.

Three orthogonally acting displacement transducers or translators 41, 42 and 43 are located on a baseplate 44 and are attached, respectively, to the feet or legs 45, 46 and 47 of a tripod 48, the upper point of which supports a thrust plate 49, preferably via a steel ball 51 projecting from a collar 52 supported by the tripod feet or legs 45 to 47. The thrust plate 49 has a hardened steel surface at the point of contact with the ball 51.

That thrust plate is sandwiched between two flexible plates 54 and 55 which are supported at the corners on four pillars 56, 57, 58 and 59.

The structure comprising plates 54 and 55 and pillars 56 to 59 is a 3-axis deformable parallelogram whose function is to transfer the movements of the tripod to the thrust plate. The legs 45 to 47 of the tripod 48 are slightly flexible and can only transmit compressive forces to the piezoelectric elements 41 to 43, respectively. This pursuant to the illustrated embodiment of the invention is the ideal way to load the elements 41 to 43, since their compressive strength is typically an order of magnitude greater than their tensile or shear strength. Furthermore all three elements 41 to 43 share the weight of the supported load 12.

Signals applied to the elements 41 to 43 cause the tripod 48 and the thrust plate 49 to move with a corresponding deformation of either the plates 54 and 55 or the pillars 56 to 59, or both. For example, in-phase signals applied to the three piezoelectric translators 41, 42 and 43 cause the tripod 48 to move upwards, causing the plates 54 and 55 to bow upwards. Out-of-phase signals cause movements of the top of the tripod in a horizontal plane, causing the pillars 56 to 59 to bend sideways.

The residual movement detector stage 20 includes a block 61 connected via the resilient mount 18 in the form of a rubber isolator 62 to the thrust plate 49. That isolator 62 is shown in section to illustrate its nature, although it is not necessarily sectioned in the view of FIG. 5. The stage 20 or block 61 further includes a plate 64 for supporting the load 12.

Within the scope of the invention, the displacement transducer stage includes a tripod structure, such as shown at 48, having three legs, such as shown at 45, 46, and 47, equipped with three displacement transducers, such as shown at 41, 42, and 43, respectively, and having a tripod head, such as shown at 51 and 52, coupled to a thrust plate 49 for displacement of the load 12. The mount 62 or another resilient mount 18 is between that thrust plate 49 and the load 12.

In FIGS. 5 and 6, the baseplate 44 is located on the floor 13 and the vibration detector stage 15 is located on such baseplate. That baseplate 44 thus in effect is the baseplate of both the vibration detector stage 15 and the displacement transducer or translator stage 16, and is thus the baseplate of the feedforward stage 14.

As shown in FIGS. 5 and 6, the vibration detector stage is in the form of three orthogonally sensitive motion or vibration detectors $15x$, $15y$, $15z$. These may, for instance, include accelerometers oriented in the x, y, and z directions, respectively.

In the embodiment shown in FIG. 5 the residual motion detector stage 20 also includes three orthogonally sensitive motion detector, such as accelerometers oriented in the x, y and z directions, respectively and connected to or suspended from the load-supporting plate 64. Residual motion detectors $20x$ and $20y$ are visible in FIG. 5 in similarity to the vibration detectors $15x$ and $15y$. However, a third motion detector $20z$ is hidden from view in FIG. 5, as is the lower detector $15z$ shown only in FIG. 6.

As to the positioning of the detectors in stages 15 and 20, the purpose of these detectors is to measure the movements of the floor 13 (lower detectors $15x$ et seq.) and of the load 12 (upper detectors, $20x$ et seq.).

The detectors $15x$ et seq. and $20x$ et seq. must be mounted in rigid contact with floor and load, respectively. However it is irrelevant whether the lower detectors $15x$ et seq., for example, are mounted between floor and translation stage, as in FIG. 1 or within the translation stage 16 but still directly coupled to the floor 13, as in FIG. 5, or even alongside the translation stage 16.

Figure 7:
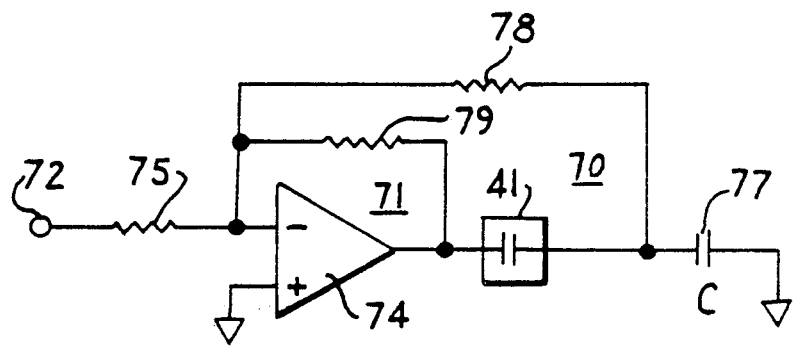
FIG. 7 is a schematic diagram of apparatus for driving piezoelectric displacement transducers according to an embodiment of the invention.

If piezoelectric translators are used in the stage 16, such as at 41, 42 and 43 in FIGS. 5 and 6, the circuit shown in FIG. 7 may be used for linearization.

By way of background, it is well-known property of piezoelectric translators that the displacements produced are not precisely linearly proportional to the applied voltage. A typical voltage-displacement characteristic would show a curve in which the displacement per unit voltage decreases with increasing voltage. Such characteristic may be linearized by the brute force method of using a non-linear voltage amplifier.

A more elegant method is based on the observation that the capacitance of the piezoelectric translator is not constant. Since the capacitance is a function of applied voltage, tending to decrease with increasing applied voltage, the charge-displacement characteristic has the opposite non-linearity to that of the voltage-displacement characteristic.

According to an embodiment of the invention shown in FIG. 7, feedback loops 70 and 71 sense both charge and voltage on the piezoelectric transducer and may therefore be used to linerize the characteristic by playing the two non-linearities against each other. Without limitation, the example illustrated in FIG. 7 is that of the translator 41 shown in FIG. 5 at the lower end of the tripod leg 45. The input terminal 72 shown in FIG. 7 would, for example, receive the output of the summing device 89 shown in FIG. 1 or in FIG. 8, described below. The high-voltage translator driving signal is applied via translator input terminal 72 and a resistor 75 to the inverting input of the high-voltage amplifier 74 which has a biased or grounded non-inverting input.

A capacitor 77 is connected as shown in FIG. 7 between the translator element 41 and ground or a source of bias potential (not shown). The capacitance of 77 should have a value some 10-100 times that of the translator element 41. The voltage on capacitor 77 measures the charge present on the piezoelectric translator element 41 and so the resistance 78 gives a feedback current or signal for the operational amplifier 74 proportional to charge. The resistor 79 senses the voltage on the translator element 41 and feeds back a current to the operational high-voltage amplifier 74 proportional to this voltage. The ratio of resistance of resistor 79 to resistor 78 can be varied, until the piezoelectric or voltage-displacement characteristic of the translator 41 has been substantially linearized.

The embodiment of FIG. 7 may be used in or for the translator stage 16 or in other dynamic systems. In either case a method of linearizing performance of a piezoelectric displacement transducer, such as the translator 41, comprises the steps of energizing that piezoelectric displacement transducer, such as via input terminal 72, providing a first feedback signal proportional to the electric charge on the piezoelectric displacement transducer, such as with feedback loop 70 and capacitor 77, providing a second feedback signal proportional to the voltage on the piezoelectric displacement transducer, such as via feedback loop 71, and linearizing the voltage-displacement characteristic of said piezoelectric displacement transducer with said first and second feedback signals, such as via amplifier 74.

The embodiment of the displacement transducer stage illustrated in FIG. 7 comprises a piezoelectric displacement transducer 41 of an inherently non-linear voltage-displacement characteristic, means 70 and 77 coupled to that piezoelectric displacement transducer for providing a first feedback signal proportional to the electric charge on the piezoelectric displacement transducer, means 71 coupled to the piezoelectric displacement transducer 41 for providing a second feedback signal proportional to the voltage on the piezoelectric displacement transducer, and means 74 for linearizing the voltage-displacement characteristic of the piezoelectric displacement transducer 41 with such first and second feedback signals.

FIG. 7 in particular shows amplifier means 74 for driving the piezoeletric displacement transducer through an amplifier output, and a capacitor 77 in series with the piezoelectric displacement transducer. The first feedback signal is provided via a first feedback loop 70 between the capacitor and an amplifier input (−), and a second feedback signal is provided via a second feedback loop 71 between the amplifier output and the amplifier input.

Figure 8:
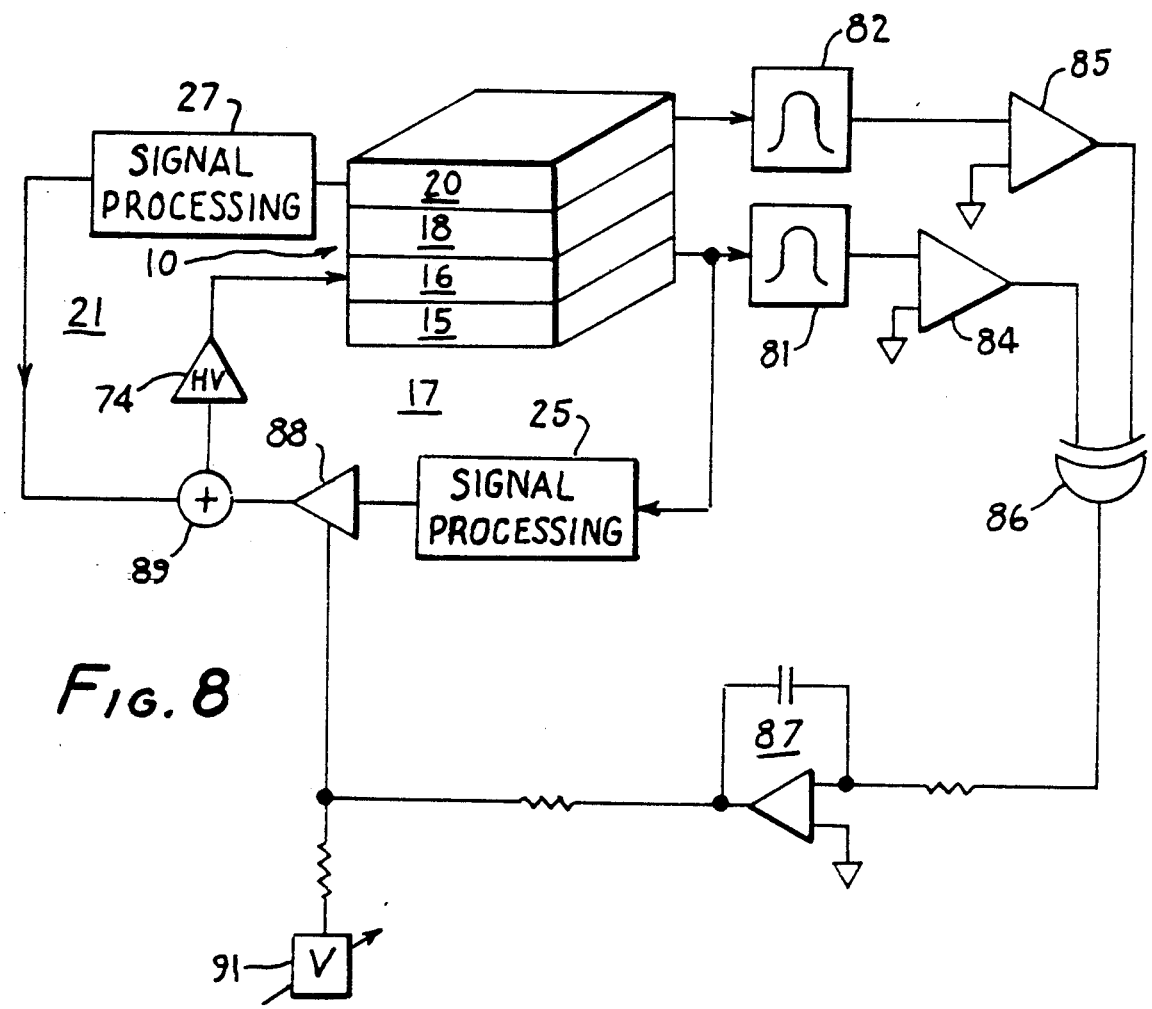
FIG. 8 is a schematic diagram of apparatus according to an embodiment of the invention for driving active vibration isolators.

Referring to FIG. 8, the signals from both vibration detector stage 15 and residual movement detector stage 20 are passed through identical bandpass filters 81 and 82, respectively, with pass bands centered to transmit the dominant vibration frequencies (for example 10–20 Hz for typical building vibrations). The outputs from the bandpass filters are converted to saturated (digital) signals by comparators 84 and 85, respectively, and the phases subsequently compared by an EXCLUSIVE OR gate 86, the output of which is negative for in-phase signals and positive for out-of-phase signals. An integrator 87 integrates this output to produce a voltage which controls the gain of a variable gain amplifier 88 placed in the feedforward loop 17 described in connection with FIG. 1. The variable gain amplifier as such is a standard item in electronics of which the familiar type CA 3080 is just one of many examples.

As in FIG. 1, a summing device 89 is used in FIG. 8 to control the translator stage 16 through high-voltage amplifier 74 with the feedforward signal from loop 17 and the feedforward signal from loop 21.

FIG. 8 also shows a source 91 of manually adjustable voltage which may be set to provide the correct gain approximately; the output of integrator 87 then being allowed to make the final adjustment.

FIG. 8 is representative of an embodiment of the invention in which the feedforward loop 17 is provided with or has an adjustable gain, such as at 88, and in which phases of signals representing the detected vibrations and signals representing the detected residual movements are compared, such as at 81, 82, 84, 85 and 86. The adjustable gain is then varied in response to that comparing of phases, or in response to a change in phase between the signals representing the detected vibrations and the signals representing the detected residual movements. The feedback loop 21 may also be provided in this embodiment to control the displacement transducer stage 16 additionally with the detected residual movements of the load 12.

Figure 9:
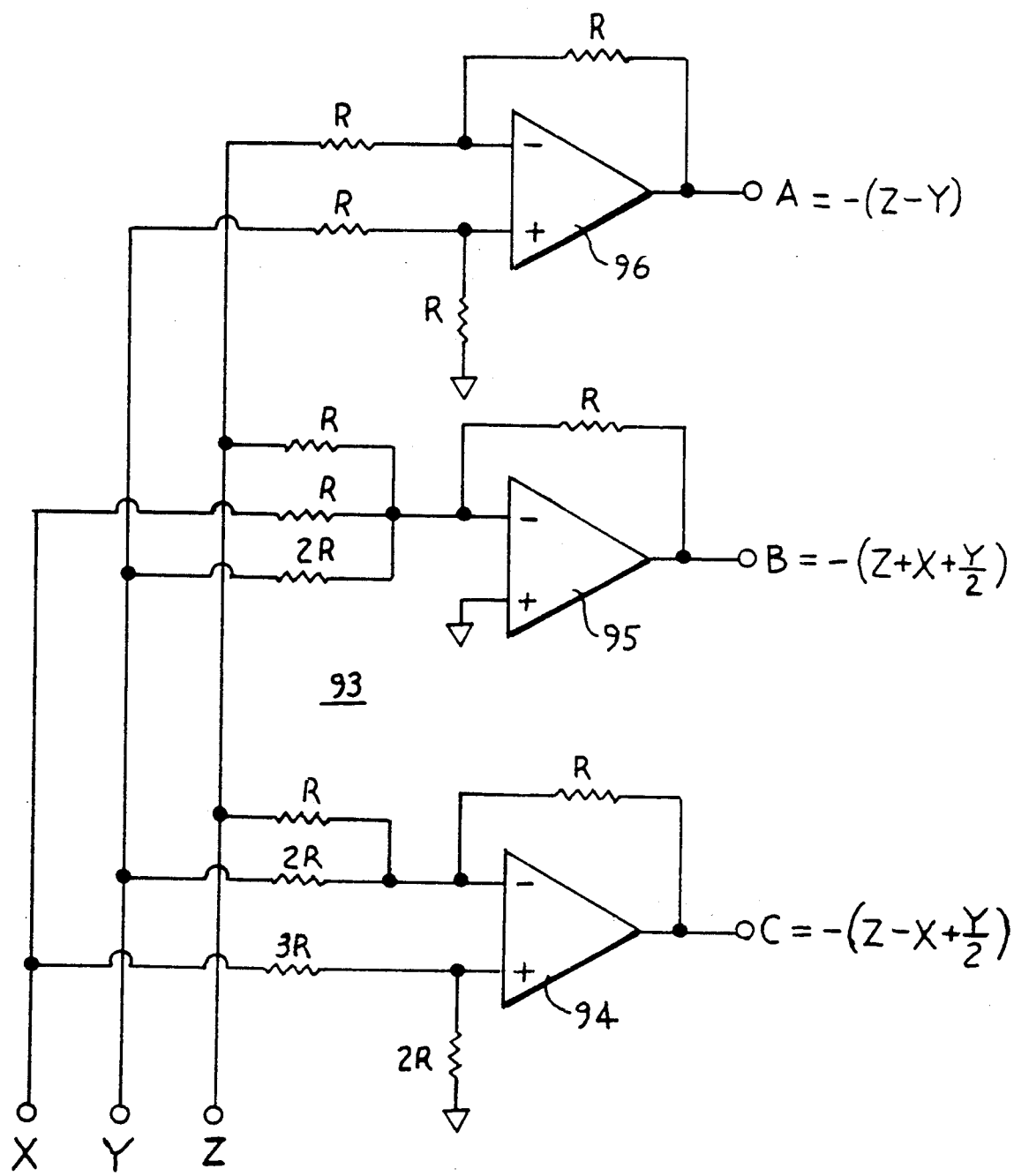
FIG. 9 is a schematic diagram of apparatus according to an embodiment of the invention for driving active vibration isolators with signals from orthogonally sensitive vibration detectors.

FIG. 9 shows an electronic circuit 93 for generating signals required to drive the piezoelectric translators 41, 42 and 43 of tripod structure 48.

In order to drive the head 51, 52 of the tripod 48 in mutually orthogonal vertical and horizontal directions as defined in FIGS. 1, 5 and 6 it is necessary to apply suitably computed signals to the three piezoelectric actuators 41, 42, and 43. Referring to FIG. 9, sensor signals x, y and z from the feedforward and feedback loops 17 and 21, or from summing devices 89 for the x, y and z sensors, are converted to output signals A, B, C with the aid of operational amplifiers 94, 95 and 96 equipped with resistors R. Relative resistor values are shown by 2R and 3R as applicable.

The output signals A, B and C of the circuit 93 are applied respectively to the high voltage amplifiers (e.g. 74) driving the actuators 41, 42, and 43. A signal input at Z causes equal signals to appear at A, B, and C thus causing a vertical (Z-axis) movement of the tripod 48, thrust plate 49 and load 12. A signal input at X causes out-of-phase signals at B and C but no signal at A, resulting in a rocking of the tripod about the Y axis with a corresponding movement of the head of the tripod along the X-axis. A signal input at Y causes the signal at A to be out of phase with and twice the amplitude of the signals at B and C. This results in a rocking of the tripod about the X axis with a corresponding movement of the head of the tripod along the Y axis.

The subject extensive disclosure will render apparent or suggest to those skilled in the art various modifications and variations within the spirit and scope of the subject invention and equivalents thereof.

We claim:

1. In a method of isolating a load from a source of vibrations, the improvement comprising in combination the steps of:

detecting vibrations from said source;

providing a displacement transducer stage for compensating said vibrations for said load;

providing a feedforward loop;

controlling said displacement transducer stage with said detected vibrations through said feedforward loop; and increasing isolation with a resilient mount between said displacement transducer stage and said load.

2. A method as in claim 1, including the steps of:

detecting residual movements of the load;

providing a feedback loop; and controlling said displacement transducer stage additionally with said detected residual movements through said feedback loop.

3. A method as in claim 2, including the step of:

supporting said load relative to said source of vibrations with said displacement transducer stage and said resilient mount in series.

4. A method as in claim 1, including the step of:

supporting said load relative to said source of vibrations with said displacement transducer stage and said resilient mount in series.

5. A method as in claim 1, including the steps of:

using in said displacement transducer stage a piezoelectric transducer of an inherently non-linear voltage-displacement characteristic;

providing a first feedback signal proportional to the electric charge on the piezoelectric displacement transducer;

providing a second feedback signal proportional to the voltage on the piezoelectric displacement transducer; and linearizing the voltage-displacement characteristic of said piezoelectric displacement transducer with said first and second feedback signals.

6. A method as in claim 1, wherein:

said vibrations are detected in three orthogonally related directions; and said transducer stage compensates said vibrations for said load in three othogonally related directions.

7. A method as in claim 6, wherein:

residual movements of said load are detected in three orthogonally related directions; and said displacement transducer stage is controlled additionally in three orthogonally related directions in response to said residual movements detected in three orthogonally related directions.

8. A method as in claim 1, including the steps of:

providing said feedforward loop with an adjustable gain;

detecting residual movements of the load;

comparing phases of signals representing said detected vibrations and signals representing said detected residual movements; and varying said adjustable gain in response to said comparing of phases.

9. A method as in claim 8, including the steps of:

providing a feedback loop; and controlling said displacement transducer stage additionally with said detected residual movements through said feedback loop.

10. A method as in claim 1, including the steps of:

providing said feedforward loop with an adjustable gain;

detecting residual movements of the load;

comparing phases of signals representing said detected vibrations and signals representing said detected residual movements; and adjusting said gain in response to a change in phase between said signals representing said detected vibrations and said signals representing said detected residual movements.

11. A method as in claim 10, including the steps of:

providing a feedback loop; and controlling said displacement transducer stage additionally with said detected residual movements through said feedback loop.

12. A method of linearizing performance of a piezoelectric displacement transducer, comprising the steps of:

energizing said piezoelectric displacement transducer;

providing a first feedback signal proportional to the electric charge on the piezoelectric displacement transducer;

providing a second feedback signal proportional to the voltage on the piezoelectric displacement transducer; and linearizing the voltage-displacement characteristic of said piezoelectric displacement transducer with said first and second feedback signals.

13. An active vibration isolator for isolating a load from a source of vibrations, comprising in combination:

a base;

a resilient mount for said load; and a feedforward vibration isolation apparatus including a vibration detector stage adapted to be coupled to said source of vibrations, a displacement transducer stage between said base and said resilient mount, and feedforward loop including said vibration detector stage and said displacement transducer stage.

14. An active vibration isolator as in claim 13, wherein:

said displacement transducer stage and said resilient mount are part of a support of said load between said source of vibrations and said load.

15. An active vibration isolator as in claim 13, wherein:

said vibration detector stage includes three orthogonally sensitive vibration detectors; and said displacement transducer stage includes three orthogonally active displacement transducers in feedforward loop relationship with said vibration detectors.

16. An active vibration isolator as in claim 13, including:

three orthogonally sensitive movement detectors adapted to be coupled to said load; and feedback loop means including said movement detectors and said displacement transducers.

17. An active vibration isolator as in claim 13, wherein:

said displacement transducer stage includes a piezoelectric displacement transducer of an inherently non-linear voltage-displacement characteristic; and said vibration isolator includes:

means coupled to said piezoelectric displacement transducer for providing a first feedback signal proportional to the electric charge on the piezoelectric displacement transducer;

means coupled to said piezoelectric displacement transducer for providing a second feedback signal proportional to the voltage on the piezoelectric displacement transducer; and means for linearizing the voltage-displacement characteristic of said piezoelectric displacement transducer with said first and second feedback signals.

18. An active vibration isolator as in claim 13, wherein:

said displacement transducer stage includes a piezoelectric displacement transducer of an inherently non-linear voltage-displacement characteristic; and said vibration isolator includes:

amplifier means for driving said piezoelectric displacement transducer through an amplifier output;

a capacitor in series with said piezoelectric displacement transducer;

a first feedback loop between said capacitor and an amplifier input; and a second feedback loop between said amplifier output and said amplifier input.

19. An active vibration isolator as in claim 13, including:

a residual movement detector stage adapted to be coupled to said load; and a feedback loop including said residual movement detector stage and said displacement transducer stage.

20. An active vibration isolator as in claim 19, wherein:

said displacement transducer stage and said resilient mount are part of a support of said load between said source of vibrations and said load.

21. An active vibration isolator as in claim 13, wherein:

said displacement transducer stage includes a tripod structure having three legs equipped with three displacement transducers and having a tripod head coupled to a thrust plate for displacement of said load.

22. An active vibration isolator as in claim 21, wherein:

said resilient mount is attached to said thrust plate.

23. An active vibration isolator as in claim 13, wherein:

said feedforward loop has an adjustable gain; and said vibration isolator includes a residual movement detector stage adapted to be coupled to said load, means for comparing phases of signals representing vibrations detected by said vibration detector stage and signals representing residual movements detected by said residual movement detector stage, and means for varying said adjustable gain in response to said comparing of phases.

24. An active vibration isolator as in claim 23, wherein:

said means for varying said adjustable gain include means for adjusting said gain in response to a change in phase between said signals representing vibrations and said signals representing residual movement.

25. An active vibration isolator as in claim 23, including:

a feedback loop including said residual movement detector stage and said displacement transducer stage.

26. A displacement transducer stage, comprising in combination:

a piezoelectric displacement transducer of an inherently non-linear voltage-displacement charactertistic;

means coupled to said piezoelectric displacement transducer for providing a first feedback signal proportional to the electric charge on the piezoelectric displacement transducer;

means coupled to said piezoelectric displacement transducer for providing a second feedback signal proportional to the voltage on the piezoelectric displacement transducer; and means for linearizing the voltage-displacment characteristic of said piezoelectric displacement transducer with said first and second feedback signals.

27. A displacement transducer stage as in claim 26, wherein:

said means for linearizing said voltage-displacement characteristic include amplifier means for driving said piezoelectric displacement transducer through an amplifier output and a capacitor in series with said piezoelectric displacement transducer;

said means for providing a first feedback signal including a first feedback loop between said capacitor and an amplifier input; and said means for providing a second feedback signal including a second feedback loop between said amplifier output and said amplifier input.

* * * * *